(12) United States Patent
Choi et al.

(10) Patent No.: US 9,343,859 B2
(45) Date of Patent: May 17, 2016

(54) MICRO USB CONNECTOR AND ELECTRONIC DEVICE INCLUDING THE SAME

(71) Applicant: LS Mtron Ltd., Gyeonggi-do (KR)

(72) Inventors: Jung-Hoon Choi, Seoul (KR); Dong-Hee Kim, Gyeonggi-do (KR); Hyun-Ho Chang, Seoul (KR)

(73) Assignee: LS MTRON LTD., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/460,547

(22) Filed: Aug. 15, 2014

(65) Prior Publication Data

US 2015/0171575 A1    Jun. 18, 2015

(51) Int. Cl.
| | |
|---|---|
| *H01R 24/62* | (2011.01) |
| *H02J 7/00* | (2006.01) |
| *H01R 12/70* | (2011.01) |
| *H01R 13/405* | (2006.01) |
| *H01R 13/6581* | (2011.01) |
| *H01R 13/648* | (2006.01) |
| *H01R 12/72* | (2011.01) |

(52) U.S. Cl.
CPC ............ *H01R 24/62* (2013.01); *H01R 12/7088* (2013.01); *H01R 13/405* (2013.01); *H02J 7/007* (2013.01); *H02J 7/0052* (2013.01); *H01R 12/724* (2013.01); *H01R 13/648* (2013.01); *H01R 13/6581* (2013.01)

(58) Field of Classification Search
CPC ..................................................... H01R 13/648
USPC ............ 439/607.01, 607.14, 607.27, 607.58, 439/660
See application file for complete search history.

(56) References Cited

U.S. PATENT DOCUMENTS

| | | | |
|---|---|---|---|
| 7,670,181 B2* | 3/2010 | Tu ...................... | H01R 13/6456 439/607.01 |
| 2005/0059301 A1* | 3/2005 | Chou ............... | G06K 19/07732 439/660 |
| 2014/0073190 A1* | 3/2014 | Zhao .................. | H01R 13/6594 439/626 |

FOREIGN PATENT DOCUMENTS

| | | | |
|---|---|---|---|
| EP | 1860739 A1 | * | 11/2007 |
| KR | 1019236 | | 3/2011 |
| KR | 2013-0033700 | | 4/2013 |

* cited by examiner

*Primary Examiner* — Abdullah Riyami
*Assistant Examiner* — Justin Kratt
(74) *Attorney, Agent, or Firm* — LRK Patent Law Firm

(57) ABSTRACT

Disclosed is a micro universal serial bus (USB) connector. The micro USB connector according to the present disclosure may include a receptacle contact including a plurality of pins, a receptacle insulator coupled to one surface of the receptacle contact, a support plate disposed on an opposite side to the receptacle contact across the receptacle insulator, and being clear of a part opposite to a pin as a power terminal of the receptacle contact, and a receptacle shell covering an exterior of the receptacle insulator where the receptacle contact and the support plate are supported.

14 Claims, 18 Drawing Sheets

(a)  (b)

MICRO USB CONNECTOR AND ELECTRONIC DEVICE INCLUDING THE SAME

CROSS-REFERENCE TO RELATED APPLICATION

The present application claims priority to Korean Patent Application No. 10-2013-0158356 filed on Dec. 18, 2013 in the Republic of Korea, the disclosures of which are incorporated herein by reference.

BACKGROUND OF THE DISCLOSURE

1. Field of the Disclosure

The present disclosure relates to a connector, and more particularly, to a micro universal serial bus (USB) connector for preventing a short that may occur between a pin serving as a power terminal among a plurality of pins of a receptacle contact and a support plate, and an electronic device including the same.

2. Description of the Related Art

Recently, portable electronic devices widely available to the public such as mobile phones, laptop computers, portable media players (PMPs), portable game consoles, MP3 players, and smart phones are expanding their types and functions day by day. In particular, a portable electronic device is equipped with a connector device for data communication, and the connector device includes a receptacle connector mounted on a printed circuit board (PCB) within the portable electronic device and a corresponding plug connector coupled thereto, and makes a data communication with an external device and is used for power supply by being connected to a power supplier.

As such a connector device, a micro universal serial bus (USB) is being widely used in recent days.

A receptacle connector for a micro USB according to a related art may include, as shown in FIG. 1, a receptacle contact 10 including a plurality of pins, a receptacle insulator 30 formed using the receptacle contact 10 by an insert molding technique, a support plate 20 serving to protect the receptacle contact from external impacts, and a receptacle shell 40 surrounding the receptacle insulator.

However, the related art has a risk of fire in the electronic device caused by a short that may occur due to a short distance between a pin serving as a power terminal among the plurality of pins of the receptacle contact and the support plate.

RELATED LITERATURES

Patent Literature (Patent Literature 1) Korean Patent No. 1019236 (Mar. 4, 2011)
(Patent Literature 2) Korean Patent Publication No. 2013-0033700 (Apr. 4, 2013)

SUMMARY OF THE DISCLOSURE

The present disclosure is designed to solve the above problem, and therefore, the present disclosure is directed to providing a micro universal serial bus (USB) connector for preventing a short between a receptacle contact and a support plate and an electronic device including the same.

To achieve the above object, a micro USB connector according to one aspect of the present disclosure includes a receptacle contact including a plurality of pins, a receptacle insulator coupled to one surface of the receptacle contact, a support plate disposed on an opposite side to the receptacle contact across the receptacle insulator, and being clear of a part opposite to a pin as a power terminal of the receptacle contact, and a receptacle shell covering an exterior of the receptacle insulator where the receptacle contact and the support plate are supported.

The support plate may include a first support plate part disposed on an opposite side to the receptacle contact, and being clear of a part opposite to the pin as a power terminal of the receptacle contact, and a second support plate part extending in an insertion direction of a plug connector from the first support plate part and having an increase in width.

A corner part formed between the first support plate part and the second support plate part may have a round shape.

A corner part formed between the first support plate part and the second support plate part may have a perpendicular shape.

A corner part formed between the first support plate part and the second support plate part may have an obliquely slanted shape.

The pin as a power terminal of the receptacle contact may have a shorter length than the other pin.

An effective contact length of the pin as a power terminal of the receptacle contact may be longer than an effective contact length of a pin serving to transmit data, and may be formed with a short length in the range in which the effective contact length of the pin as a power terminal may be longer than an effective contact length of the pin serving to transmit data.

A non-through hole-type pitch guide may be present between a pin serving as a power terminal and a neighbor pin serving to transmit data among the plurality of pins of the receptacle contact.

The support plate may be made of stainless.

To achieve the above object, an electronic device according to another aspect of the present disclosure includes at least one processor, a memory, at least one program stored in the memory and configured to be executed by the at least one processor, and a micro USB connector, wherein the micro USB connector may be the above micro USB connector.

To achieve the above object, an electronic device according to still another aspect of the present disclosure includes a battery mounting section, a charger circuit configured to receive power from a micro USB connector and charge a battery mounted in the battery mounting section, a charge controller configured to perform control to charge the battery mounted in the battery mounting section, and a micro USB connector connected to an external charger terminal through a micro USB cable to supply power to the battery mounted in the battery mounting section, wherein the micro USB connector may be the above micro USB connector.

According to one aspect of the present disclosure, there is an effect of preventing damage to an electronic device by preventing a short in the presence of an insulation distance provided by removing a part of a support plate disposed on a pin serving as a power terminal among a plurality of pins of a receptacle contact and forming the pin serving as a power terminal to have a shorter length than the other pins.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Also, in the description of the present disclosure, when it is deemed that a specific explanation of related well-known functions or constructions may obscure the essence of the invention, their detailed description is omitted.

Figure 1:
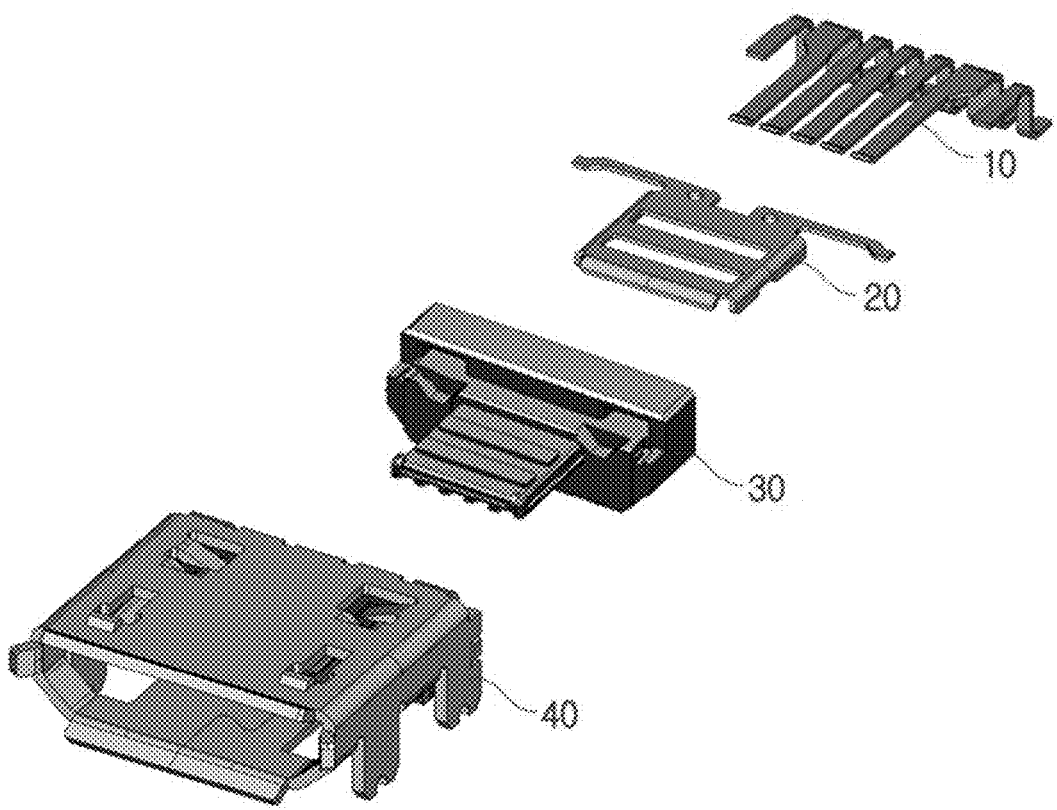
FIG. 1 is an exploded perspective view illustrating a micro universal serial bus (USB) connector according to a related art.
Figure 2:
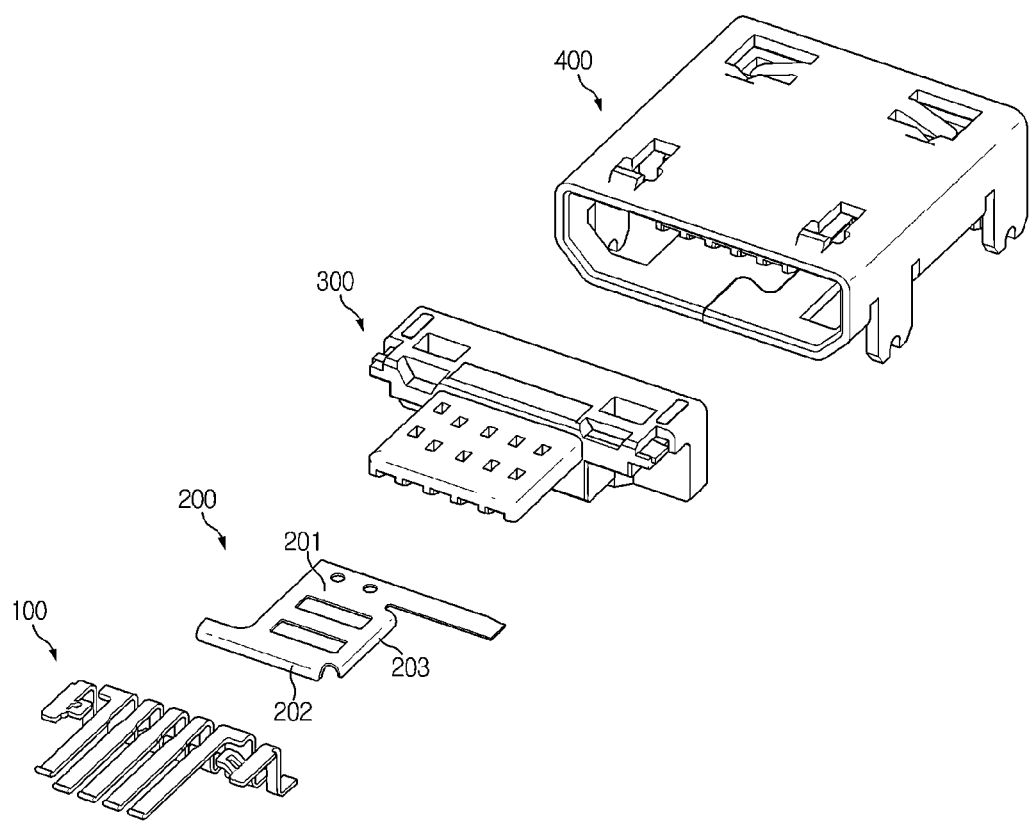
FIG. 2 is an exploded perspective view illustrating a micro USB connector according to an exemplary embodiment of the present disclosure.

FIG. 2 is an exploded perspective view illustrating a micro universal serial bus (USB) connector according to an exemplary embodiment of the present disclosure.

Referring to FIG. 2, the micro USB connector according to this exemplary embodiment includes a receptacle contact 100, a receptacle insulator 300, a support plate 200, and a receptacle shell 400.

The receptacle contact 100 may include five pins arranged at a predetermined pitch to satisfy a general micro USB pin standard, and serve to provide an electrical contact part with a plug contact of a plug connector. Among the plurality of pins of the receptacle contact, a first pin 101 serving as a power terminal may be formed to have a shorter length than the other pins. The reason that the first pin 101 serving as a power terminal is formed to have a shorter length than the other pins is to prevent a short by providing an insulation distance from the support plate to be described below. A detailed description of the first pin 101 serving as a power terminal will be provided below.

Figure 12:
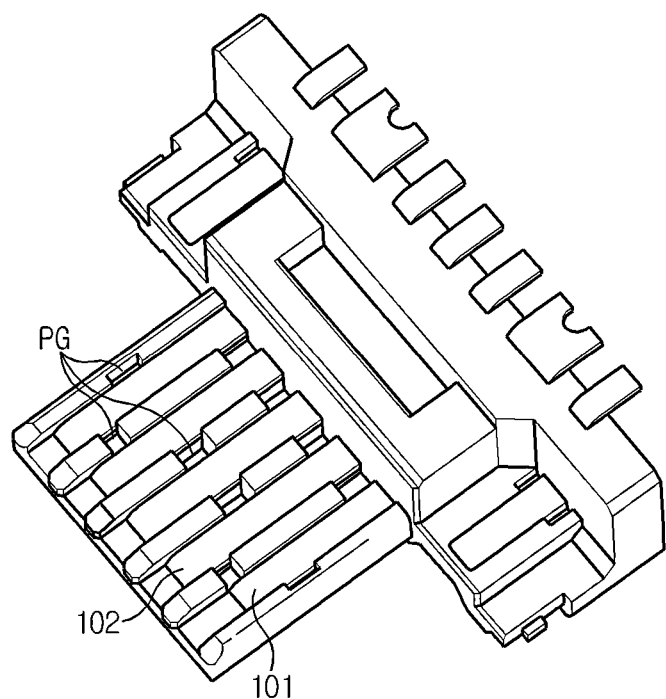
FIG. 12 is a diagram illustrating a shape of a pitch guide according to an exemplary embodiment of the present disclosure.

The receptacle insulator 300 may be formed by pouring plastic resin by an insert molding technique. More specifically, the receptacle insulator 300 may be formed by putting the receptacle contact 100 and the support plate 200 to be described below in an insert molding mold, and after fixing the receptacle contact 100 and the support plate 200 with a jig, pouring plastic resin into the mold. In this instance, when plastic resin is poured into the mold, the receptacle contact 100 and the support plate 200 put in the insert molding mold are fixed with a jig to prevent them from moving. FIG. 12 is a diagram illustrating a shape of a pitch guide according to an exemplary embodiment of the present disclosure, and referring to FIG. 12, it can be seen that a plurality of pitch guides (PGs) are formed by use of the jig for fixing the support plate 200. Among them, the center pitch guide (PG) may be formed as a hollow penetrating the insulator, and as the jig passes through the corresponding hollow, the support plate 200 may be fixed while maintaining an interval between the pins of the receptacle contact 100.

Also, the pitch guide (PG) between the first pin 101 serving as a power terminal and a second pin 102 for data communication in the receptacle contact 100 has a hole which does not penetrate the insulator. If a hollow penetrating the insulator is present between the first pin 101 serving as a power terminal and the second pin for data communication, an impurity may be introduced into the hollow and a short may occur between the first pin 101 as a power terminal of the receptacle contact 100 and the support plate 200, leading to a fire in the electronic device. Accordingly, as shown in FIG. 12, the pitch guide (PG) between the first pin 101 serving as a power terminal and the second pin 102 for data communication in the receptacle contact 100 is not a through-hole type penetrating the insulator while maintaining an interval between the two pins. The pitch guide (PG) is not limited to a specific number or location if it is designed to maintain spacing in the receptacle contact 100 and prevent the receptacle contact 100 and the support plate 200 from moving when pouring plastic resin into the insert molding mold, and so long as the pitch guide (PG) between the first pin 101 serving as a power terminal and the neighboring second pin 102 for data transmission in the receptacle contact 100 is not a through-hole type penetrating the insulator, there is no special limitation.

The support plate 200 may cover a part of the receptacle insulator 300 where the receptacle contact 100 is supported, to protect the receptacle connector from external impacts, and may be made of stainless. The support plate 200 may be disposed on an opposite side to the receptacle contact 100 across the receptacle insulator 300. The support plate 200 may include a first support plate part 201 covering a part of the receptacle insulator 300 where the receptacle contact 100 is supported, a second support plate part 202 bent while extending in an insertion direction of the plug connector from the first support plate part 201, and a third support plate part 203 bent while extending, from the first support plate part 201, in an outer side direction in which the receptacle contact 100 is absent.

A shown in FIG. 2, the first support plate part 201 is disposed on the receptacle insulator 300 where the receptacle contact 100 is supported, and is cut off to avoid covering a part of the receptacle insulator 300 where the first pin 101 as a power terminal of the receptacle contact 100 is disposed. Accordingly, occurrence of a short may be prevented in advance by providing an insulation distance between the first pin 101 of the receptacle contact 100 and the support plate 200.

Along with this, by providing an insulation distance from the second support plate part 202 bent in an insertion direction of the plug connector by forming the first pin 101 as a power terminal of the receptacle contact 100 to have a shorter length than the other pins as described in the foregoing, occurrence of a short may be prevented. However, a cut-off area of the first support plate part 201 and the second support plate part 202 is not limited to a particular shape, and may be formed in various shapes allowing for an insulation distance. Its various exemplary embodiments will be described in detail with reference to FIGS. 3 through 11.

The receptacle shell 400 may serve to cover and shield at least a part or entirety of the receptacle insulator 300, and aid the coupling of the corresponding plug connector to the receptacle connector.

The support plate 200 and the receptacle contact 100 according to the present disclosure have the foregoing features, and may have, but not limited to, various shapes. Accordingly, various exemplary embodiments including the above features of the present disclosure are described in detail below to help the understanding of the present disclosure.

(1) Cut-Off Area of a Support Plate Exposing a First Pin 101 as a Power Terminal of a Receptacle Contact Embodiment 1-1

Figure 3:
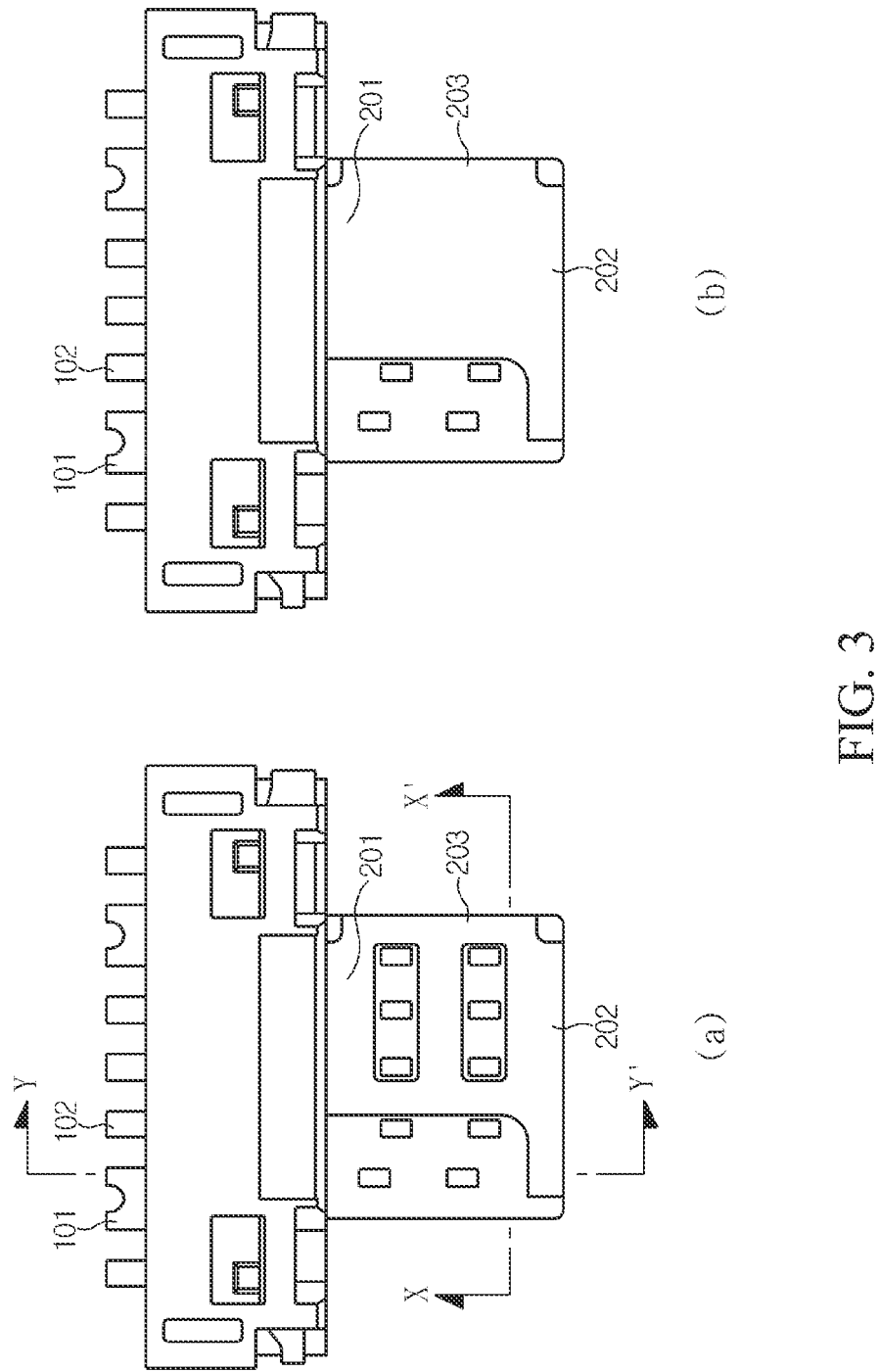
FIG. 3 shows a diagram (a) illustrating a receptacle insulator coupled with a support plate according to an exemplary embodiment of the present disclosure, and a diagram (b) illustrating a receptacle insulator coupled with a support plate according to another exemplary embodiment of the present disclosure.

According to an exemplary embodiment of the present disclosure, a receptacle insulator 300 is formed by putting a receptacle contact 100 including a plurality of pins and a support plate 200 in an insert molding mold, fixing them with a jig, and pouring plastic resin into the mold. In this instance, when inserting a plug connector, the support plate 200 is disposed on an opposite surface to a surface where the receptacle contact 100 comes into contact with and is electrically connected to a plug contact of the plug connector. That is, the support plate 200 is disposed on an opposite side to the receptacle contact 100 across the receptacle insulator 300. FIG. 3 shows a diagram (a) illustrating the receptacle insulator 300 coupled with the support plate 200 according to an exemplary embodiment of the present disclosure, and a diagram (b) illustrating a receptacle insulator coupled with a support plate according to another exemplary embodiment of the present disclosure, and referring to (a) in FIG. 3, when viewed from the surface where the support plate 200 is coupled, a first support plate part 201 has a removed part to avoid covering a first pin 101 serving as a power terminal and a second pin 102 for data transmission in the receptacle contact 100. That is, the first support plate part 201 may be formed by removing a part opposite to the first pin 101 and the second pin 102 of the receptacle contact 100. In this instance, the support plate 200 may be formed, as shown in (a) of FIG. 3, such that the receptacle contact 100 disposed at a location opposite to the support plate 200 is exposed to view by removing a partial area of the first support plate 201 of the support plate 200, but it not limited thereto, and as shown in (b) of FIG. 3, the support plate 200 may be formed such that the receptacle contact 100 disposed at a location opposite to the support plate 200 is not seen by forming the first support plate 201 in a shape of a solid plate over the area of the first support plate 201.

Embodiment 1-2

Figure 4:
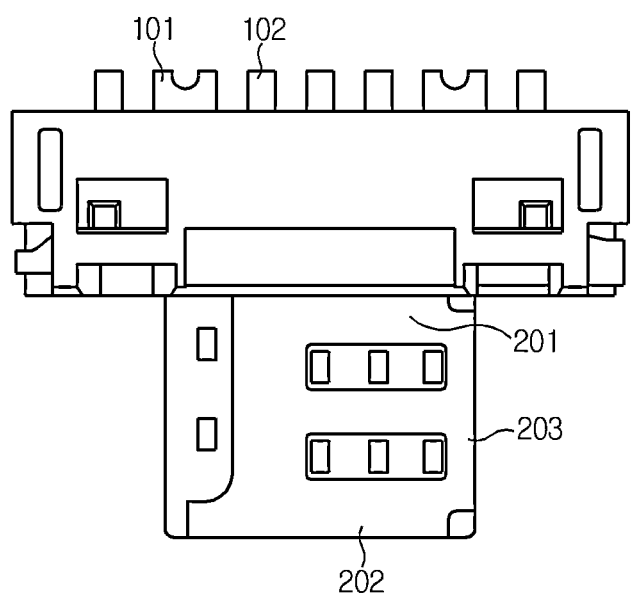
FIG. 4 is a diagram illustrating a receptacle insulator coupled with a support plate according to another exemplary embodiment of the present disclosure.

While the first support plate part 201 is clear of a part opposite to the first pin 101 and the second pin 102 of the receptacle contact 100 as shown in Embodiment 1-1, a first support plate part 201 of Embodiment 1-2 is clear of a part opposite to only a first pin 101 of a receptacle contact 100 while leaving parts of the first support plate part 201 opposite to second through fifth pins. The components or a forming process of a receptacle connector is the same as Embodiment 1-1, and a support plate 200 according to this embodiment is illustrated in FIG. 4.

Embodiment 1-3

Figure 5:
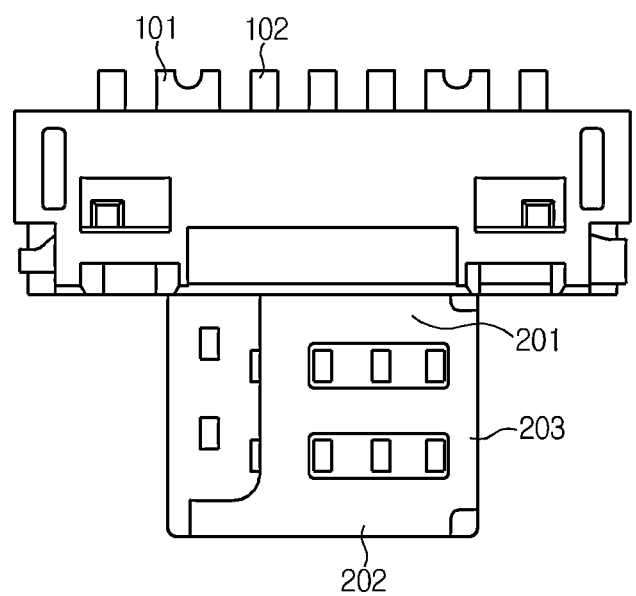
FIG. 5 is a diagram illustrating a receptacle insulator coupled with a support plate according to still another exemplary embodiment of the present disclosure.

In this embodiment, a first support plate part 201 may be formed with a removed part exposing an entirety of a first pin 101 serving as a power terminal and only a part of a second pint 102 in a receptacle contact 100. The components or a forming process of a receptacle connector is the same as Embodiment 1-1, and a support plate 200 according to this embodiment is illustrated in FIG. 5.

Figure 6:
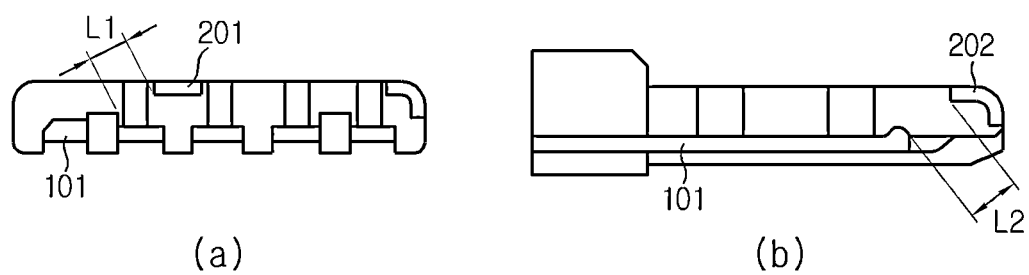
FIG. 6 shows a cross sectional view (a) taken along the line X-X' of FIGS. 3(a) and a cross sectional view (b) taken along the line Y-Y' of FIG. 3(a).

As seen in the above Embodiments 1-1 through 1-3, when viewing the receptacle contact 100, the receptacle insulator 300, and the support plate 200 coupled by insert molding from the surface where the support plate 200 is coupled, the support plate 200 is formed such that the first pin 101 serving as a power terminal is not covered among the plurality of pins of the receptacle contact 100. (a) in FIG. 6 is a cross sectional view taken along the line X-X' of FIG. 3(a), and as shown in (a) in FIG. 6, a fire in the electronic device caused by occurrence of a short may be prevented by providing an insulation distance L1 between the first pin 101 as a power terminal of the receptacle contact 100 and the first support plate part 201.

(2) Shape of a Support Plate

Embodiment 2-1

According to an exemplary embodiment of the present disclosure, a receptacle insulator 300 is formed by putting a receptacle contact 100 and a support plate 200 in an insert molding mold, fixing them with a jig, and pouring plastic resin into the mold. In this instance, the support plate 200 is disposed opposite to the receptacle contact 100, and a receptacle insulator 300 is disposed between the support plate 200 and the receptacle contact 100. As in the drawing of FIG. 3, when viewed from the surface where the support plate 200 is coupled, a first support plate part 201 may be formed with a removed part to avoid covering a first pin 101 serving as a power terminal and a second pin 102 serving to transmit data.

Figure 7:
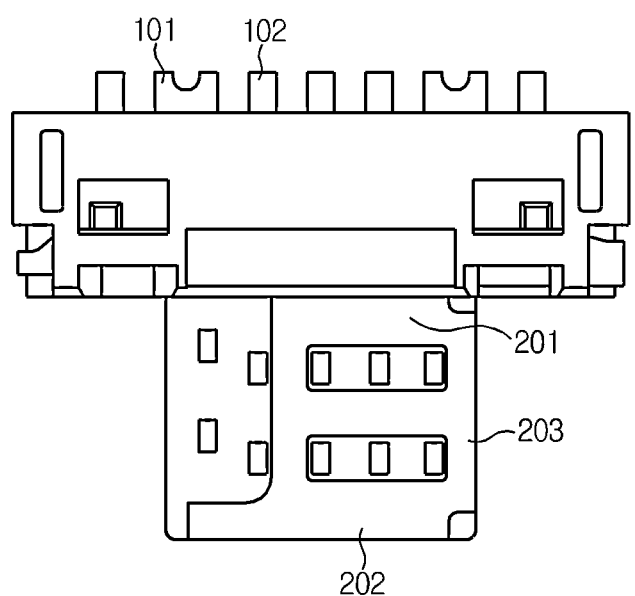
FIG. 7 is a diagram illustrating a support plate according to an exemplary embodiment of the present disclosure.

Also, to prevent damage to the receptacle insulator 300 due to friction occurring when inserting a plug connector, a second support plate part 202 bent while extending in an insertion direction of the plug connector from the first support plate part 201 may be formed. In this instance, the second support plate part 202 extends from the first support plate part 201 and has an increase in width when compared to the first support plate part 201, and due to the increase in width, a corner part is formed between the first support plate part 201 and the second support plate part 202. FIG. 7 illustrates this example. To prevent a short between the second support plate part 202 and the first pin 101 serving as a power terminal, an insulation length L2 of a predetermined distance may be provided by forming the first pin 101 serving as a power terminal to have a shorter length than the other pins as shown in (b) in FIG. 6.

Embodiment 2-2

Figure 8:
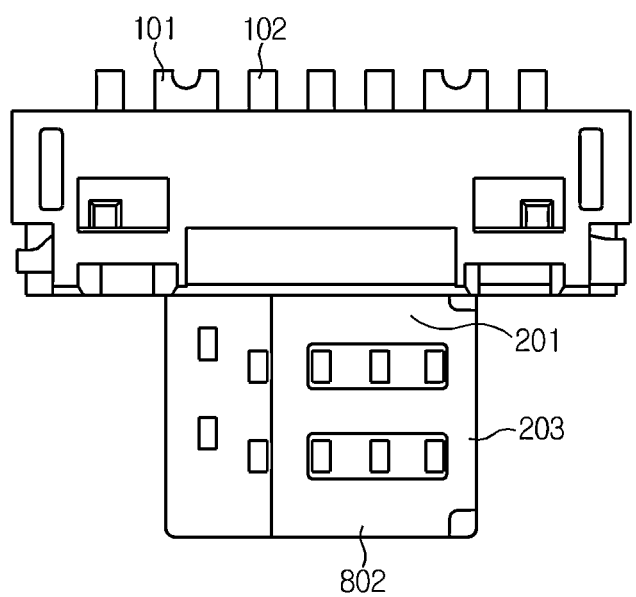
FIG. 8 is a diagram illustrating a support plate according to another exemplary embodiment of the present disclosure.

According to another exemplary embodiment of the present disclosure, a second support plate part 802 bent while extending in an insertion direction of a plug connector from a first support plate part 201 may be formed with a removed part coming into contact with a removed part of the first support plate part 201, and components or a forming process of a receptacle connector is the same as Embodiment 2-1. The second support plate part 802 according to this embodiment is illustrated in FIG. 8. As opposed to Embodiment 2-1, when extending from the first support plate part 201, the second support plate part 802 does not increase in width and has the same width as the first support plate part 201. Similar to Embodiment 2-1, a first pin 101 serving as a power terminal may be formed to have a shorter length than the other receptacle contact 100 pins, and as conventional, may be formed to have the same length.

(3) Shape of a Corner Part Between a First Support Plate Part and a Second Support Plate Part Embodiment 3-1

Figure 9:
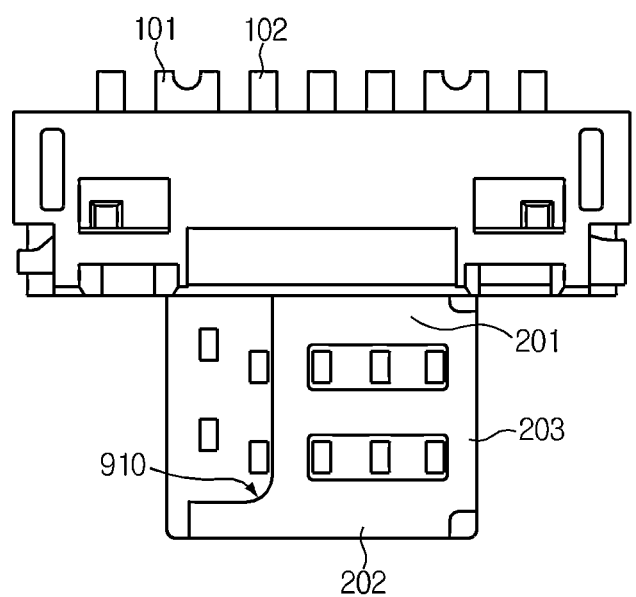
FIG. 9 is a diagram illustrating a shape of a corner part of a support plate according to an exemplary embodiment of the present disclosure.

According to an exemplary embodiment of the present disclosure, components or a forming process of a receptacle connector is the same as Embodiment 1-1, and its drawing is illustrated in FIG. 9. FIG. 9 is a diagram illustrating a shape of a corner part of a support plate 200 according to an exemplary embodiment of the present disclosure, and referring to FIG. 9, a corner part 910 between a first support plate part 201 and a second support plate part 202 according to this embodiment may be formed in a round shape.

By forming the corner part 910 in a round shape, durability of the support plate 200 may be improved.

Embodiment 3-2

Figure 10:
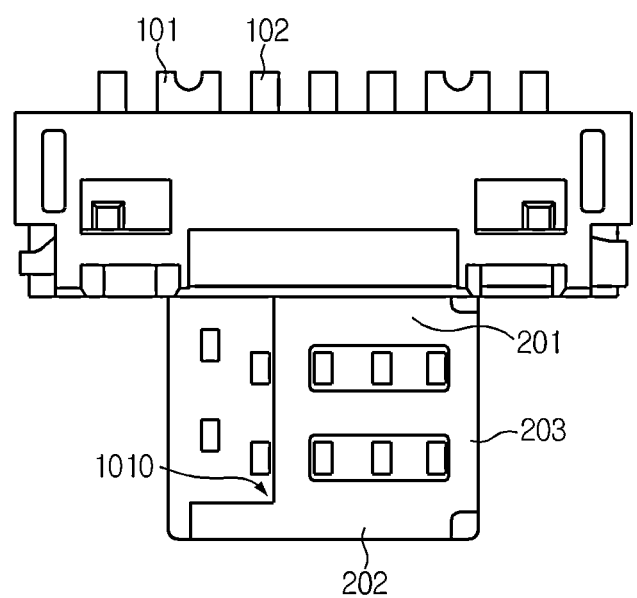
FIG. 10 is a diagram illustrating a shape of a corner part of a support plate according to another exemplary embodiment of the present disclosure.

According to another exemplary embodiment of the present disclosure, a corner part 1010 between a first support plate part 201 and a second support plate part 202 may be formed in a perpendicular shape, components or a forming process of a receptacle connector is the same as Embodiment 3-1, and a support plate 200 according to this embodiment is illustrated in FIG. 10.

In comparison to the shape of the corner part of Embodiment 3-1 as described in the foregoing, the corner part 1010 formed in this embodiment may provide an insulation distance from a first pin 101 of a receptacle contact 100 serving as a power terminal more effectively.

Embodiment 3-3

Figure 11:
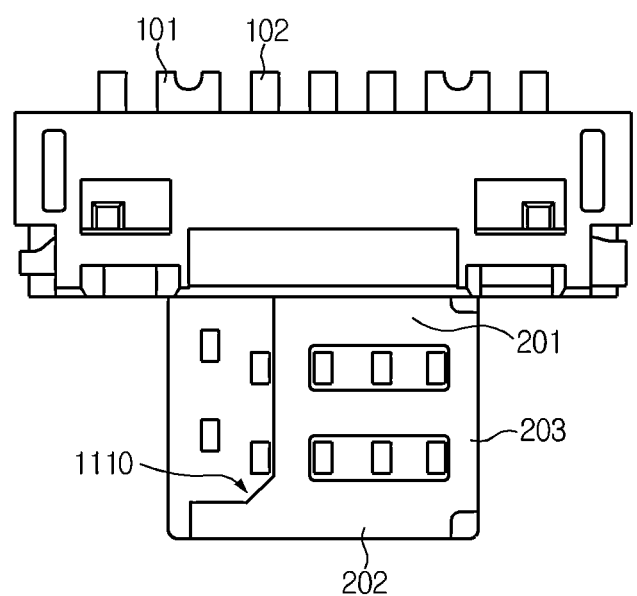
FIG. 11 is a diagram illustrating a shape of a corner part of a support plate according to still another exemplary embodiment of the present disclosure.

According to still another exemplary embodiment of the present disclosure, a corner part 1110 between a first support plate part 201 and a second support plate part 202 may be formed in an obliquely slanted shape, components or a forming process of a receptacle connector is the same as Embodiment 3-1, and a support plate 200 according to this embodiment is illustrated in FIG. 11.

The corner part 1110 formed in this embodiment may be more effective in terms of durability than the corner parts 910 and 1010 of Embodiments 3-1 and 3-2 as described in the foregoing.

As described in the foregoing, the corner parts 910, 1010, and 1110 formed between the first support plate part 201 and the second support plate part 202 are not limited to a specific shape if such a shape may provide a predetermined insulation distance between the first pin 101 serving as a power terminal and the first support plate part 201, and when the corner parts 910 and 1110 have a shape as shown in FIG. 9 or 11, forces applied when inserting the plug connector may be absorbed, and as a consequence, durability of the support plate 200 may be improved, in comparison to the shape shown in FIG. 10.

(4) Receptacle Insulator when Coupling a Plug Connector According to an Exemplary Embodiment of the Present Disclosure According to an exemplary embodiment of the present disclosure, a receptacle insulator 300 is formed by putting a receptacle contact 100 including a plurality of pins and a support plate 200 in an insert molding mold, fixing them with a jig, and pouring plastic resin into the mold. In this instance, when inserting a plug connector, the support plate 200 is disposed on an opposite surface to a surface where the receptacle contact 100 comes into contact with and is electrically connected to a plug contact of the plug connector. That is, the support plate 200 is disposed on an opposite side to the receptacle contact 100 across the receptacle insulator 300. Similar to the drawing of FIG. 3, when viewed from the surface where the support plate 200 is coupled, a first support plate part 201 may be formed with a removed part to avoid covering a first pin 101 serving as a power terminal and a second pin 102 serving to transmit data. In this instance, to provide an insulation distance between the first pin 101 serving as a power terminal and the first support plate part 201, the first support plate part 201 may be formed with a removed part, and in addition, the first pin 101 serving as a power terminal may be formed to have a shorter length than the other pins as shown in FIG. 13.

Figure 13:
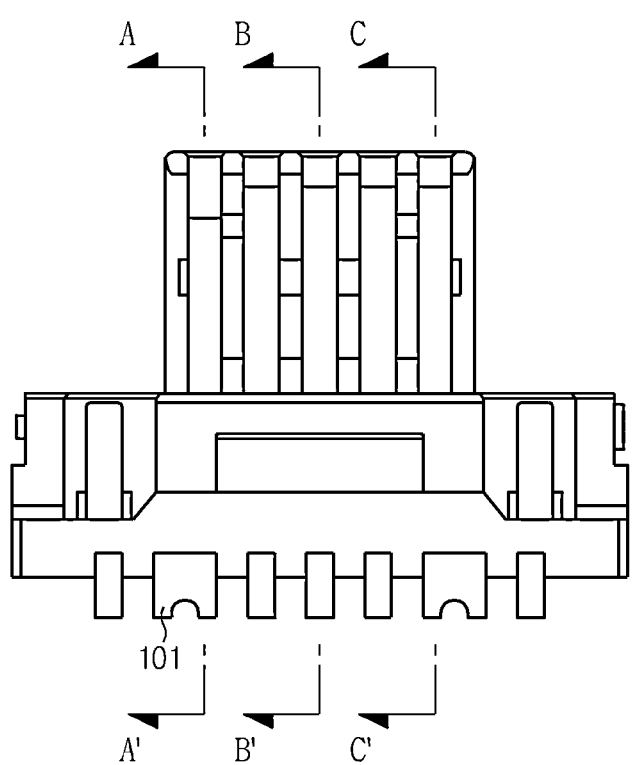
FIG. 13 is a diagram illustrating a receptacle contact according to an exemplary embodiment of the present disclosure.
Figure 14:
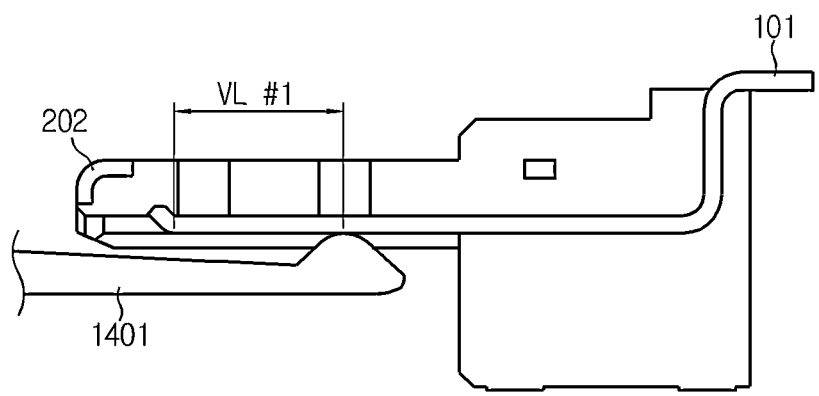
FIG. 14 is a cross sectional view taken along the line A-A' of FIG. 13.
Figure 15:
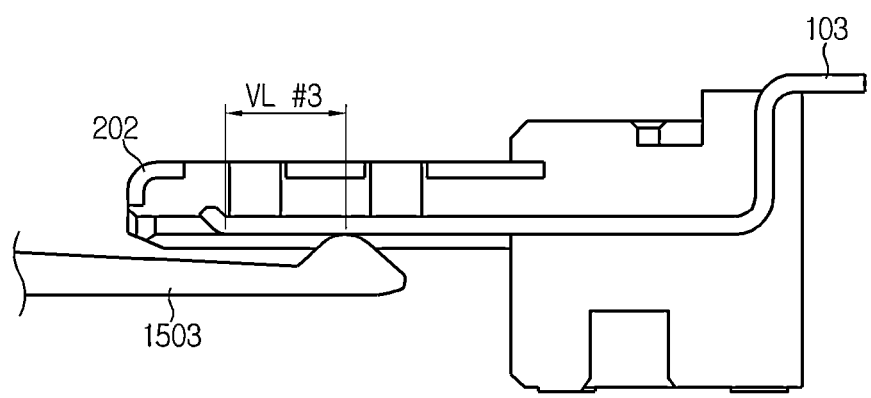
FIG. 15 is a cross sectional view taken along the line B-B' of FIG. 13.
Figure 16:
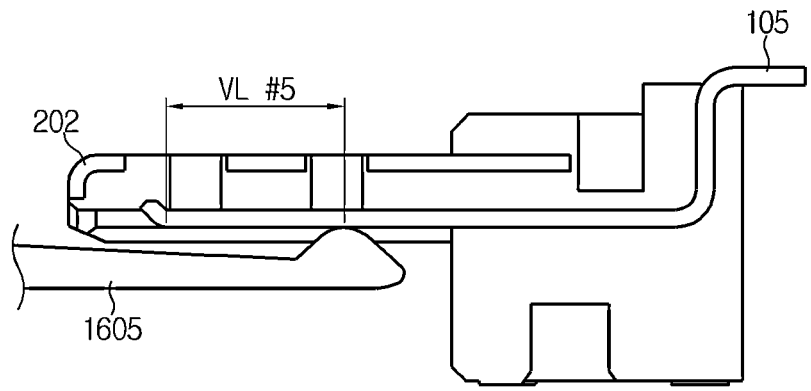
FIG. 16 is a cross sectional view taken along the line C-C' of FIG. 13.

FIGS. 14 through 16 are cross sectional views taken along the line A-A', the line B-B', and the line C-C' of FIG. 13, and illustrate, when a plug connector is inserted into a receptacle connector, an effective contact length of each contact that makes contact with each other. The effective contact length represents an effective length which provides a favorable contact point in the contact between the receptacle contact 100 and the plug contact.

The receptacle contact according to the related art has all pins of the same length, and a plug contact coupled at a location corresponding to the receptacle contact has a first pin and a fifth pin longer than second through fourth pins. Accordingly, in the receptacle contact according to the related art, an effective contact length of a first pin serving as a power terminal is longer than an effective contact length of second through fourth pins serving to transmit data, and is equal to an effective contact length of a fifth pin.

However, according to the present disclosure, the first pin 101 serving as a power terminal may be formed to have a shorter length than the other pins to provide an insulation distance from the second support plate part 202. In this instance, the first pin 101 may be formed with a short length in the range in which a contact with a plug contact is made, but may be formed in consideration of an effective contact length.

That is, an effective contact length VL#1 of the first pin 101 serving as a power terminal is preferably longer than an effective contact length VL#3 of the second through fourth pins serving to transmit data, and in consideration of the effective contact length, the first pin 101 serving as a power terminal may be formed with a short length.

For example, an effective contact length VL#3 of the second through fourth pins may be 0.9 mm, an effective contact length VL#5 of the fifth pin may be 1.3 mm, and an effective contact length VL#1 of the first pin may be 1.0 mm which is longer than the effective contact length VL#3 of the second through fourth pins. In this instance, the length of the other pins 103 and 105 than the first pin 101 may be 2.1 mm, and the first pin 101 may be formed with a short length of 1.8 mm in consideration of the effective contact length, to provide an insulation distance from the second support plate part 202.

The reason that the length of the first pin 101 is determined in consideration of the effective contact length is to prevent power off and consequently data transmission failure which may occur during data transmission through second through fourth pins in the event that a plug connector is withdrawn and removed when the receptacle connector is coupled with the plug connector, if the first pin 101 serving as a power terminal is formed with a short length unconditionally regardless of the above condition (for example, when the effective contact length of the first pin 1.5 mm long is 0.7 mm shorter than the effective contact length 0.9 mm of the second through fourth pins), because a first pin 1401 and a fifth pin 1605 of the plug contact coupled at a location corresponding to the receptacle contact are longer than a second pin (not shown), a third pin 1503, a fourth pin (not shown) as described in the foregoing.

(5) Electronic Device Including a Micro USB Connector

Embodiment 5-1

Figure 17:
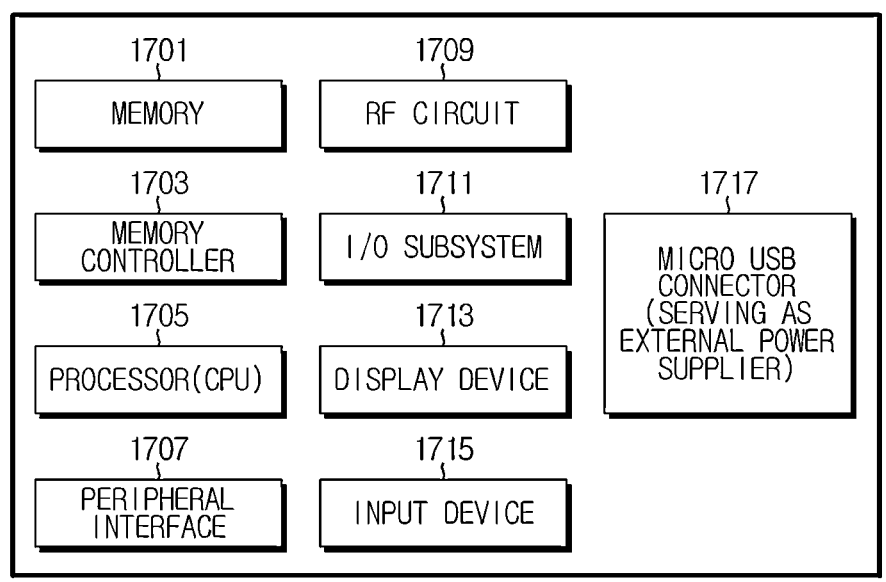
FIG. 17 is a diagram illustrating a structure of a mobile communication terminal including a micro USB connector according to an exemplary embodiment of the present disclosure.

FIG. 17 is a diagram illustrating a structure of a mobile communication terminal according to an exemplary embodiment of the present disclosure. As shown in FIG. 17, the mobile communication terminal including the micro USB connector according to the present disclosure includes a memory 1701, a memory controller 1703, a processor (CPU) 1705, a peripheral interface 1707, a radio frequency (RF) circuit 1709, an input/output (I/O) subsystem 1711, a display device 1713, an input device 1715, and a micro USB connector 1717.

The components shown in FIG. 17 may be implemented as hardware, software, or a combination of hardware and software, including at least one signal processing and/or application dedicated direct circuit.

The memory 1701 may include a high-speed random access memory, and may include at least one non-volatile memory such as a magnetic disk storage device and a flash memory device or other non-volatile semiconductor memory device.

The memory controller 1703 may control an access to the memory by other component of the device such as the processor and the peripheral interface.

The processor (CPU) 1705 is a processor configured to perform an operation associated with the device and execute instructions, and at least one processor may be provided to execute an instruction set stored in various software programs and/or memories to perform various functions for the device and process data.

The peripheral interface 1707 connects an input/output peripheral device of the device to the processor and the memory.

The radio frequency (RF) circuit 1709 transmits and receives electromagnetic waves. The RF circuit converts an electrical signal to electromagnetic waves and vice versa, and through the electromagnetic waves, communicates with a communication network or other mobile gateway and communication device.

The input/output (I/O) subsystem 1711 provides an interface between an input/output peripheral device of the device such as the display device and other input device and the peripheral interface.

The display device 1713 may use liquid crystal display (LCD) technology or light emitting polymer display (LPD) technology, and the display device may be a capacitive, resistive, or infrared touch display.

The micro USB connector 1717 may be the above micro USB connector according to the present disclosure, and may be connected to an external device through a micro USB cable to receive power from the external device and exchange data with the external device.

Although this embodiment takes a mobile communication terminal as an example of an electronic device, a personal computer or a camera may be given, and the present disclosure is not limited in this regard and any device including the micro USB connector according to the present disclosure may be used.

Embodiment 5-2

Figure 18:
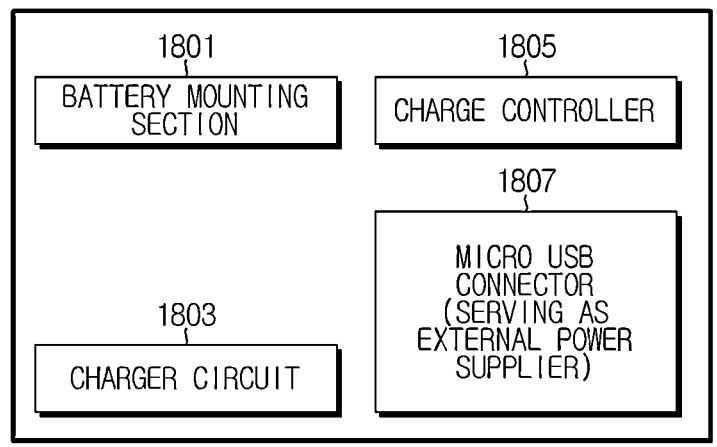
FIG. 18 is a diagram illustrating a structure of a charger device including a micro USB connector according to an exemplary embodiment of the present disclosure.

The micro USB connector according to the present disclosure may be included in a charger device, and its structure is illustrated in FIG. 18. FIG. 18 is a diagram illustrating a structure of a charger device according to an exemplary embodiment of the present disclosure.

The charger device including the micro USB connector according to the present disclosure includes a battery mounting section 1801, a charger circuit 1803, a micro USB connector 1807, and a charge controller 1805.

The battery mounting section 1801 may be a space into which a battery to be charged is inserted, and is not limited to a specific shape if such a shape allows a battery to be inserted and mounted.

The charger circuit 1803 may serve to receive power from the micro USB connector to be described below and charge the battery.

The micro USB connector 1807 may be the above micro USB connector according to the present disclosure, and through a micro USB cable, may be connected to an external charger terminal to supply power to the battery mounted in the battery mounting section of the charger device.

The charge controller 1805 may serve to control the components to charge the battery mounted in the battery mounting section.

In this instance, the charger device may be a battery charger (BTC), but is not limited thereto, and any device including the micro USB connector according to the present disclosure and capable of charging may be used.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A micro universal serial bus (USB) connector, comprising:
   a receptacle insulator;
   a receptacle contact including a plurality of pins and coupled to one surface of the receptacle insulator;
   a support plate coupled to another surface of the receptacle insulator and being opposite to the receptacle contact across the receptacle insulator; and
   a receptacle shell covering an exterior of the receptacle insulator where the receptacle contact and the support plate are supported,
   wherein a part of the support plate opposite to a pin as a power terminal of the receptacle contact is removed.

2. The micro USB connector according to claim 1, wherein the support plate comprises:
   a first support plate part disposed on an opposite side to the receptacle contact, and being clear of a part opposite to the pin as a power terminal of the receptacle contact; and
   a second support plate part extending in an insertion direction of a plug connector from the first support plate part and having an increase in width.

3. The micro USB connector according to claim 2, wherein a corner part formed between the first support plate part and the second support plate part has a round shape.

4. The micro USB connector according to claim 2, wherein a corner part formed between the first support plate part and the second support plate part has a perpendicular shape.

5. The micro USB connector according to claim 2, wherein a corner part formed between the first support plate part and the second support plate part has an obliquely slanted shape.

6. The micro USB connector according to claim 1, wherein the pin as a power terminal of the receptacle contact has a shorter length than the other pin.

7. The micro USB connector according to claim 6, wherein an effective contact length of the pin as a power terminal of the receptacle contact is longer than an effective contact length of a pin serving to transmit data.

8. The micro USB connector according to claim 1, wherein a non-through hole-type pitch guide is present between a pin serving as a power terminal and a neighbor pin serving to transmit data among the plurality of pins of the receptacle contact.

9. The micro USB connector according to claim 1, wherein the support plate is made of stainless steel.

10. An electronic device, comprising:
    at least one processor;
    a memory;
    at least one program stored in the memory and configured to be executed by the at least one processor; and
    a micro universal serial bus (USB) connector,
    wherein the micro USB connector is a micro USB connector according to any one of claims 1 through 9.

11. An electronic device, comprising:
    a battery mounting section;
    a charger circuit configured to receive power from a micro universal serial bus (USB) connector and charge a battery mounted in the battery mounting section;
    a charge controller configured to perform control to charge the battery mounted in the battery mounting section; and
    a micro USB connector connected to an external charger terminal through a micro USB cable to supply power to the battery mounted in the battery mounting section,
    wherein the micro USB connector is a micro USB connector according to any one of claims 1 through 9.

12. The micro USB connector according to claim 1, wherein the removed part of the support plate exposes an entirety of the pin as a power terminal.

13. The micro USB connector according to claim 1, wherein the removed part of the support plate exposes an entirety of the pin as a power terminal and a part of a pin adjacent to the pin as a power terminal.

14. The micro USB connector according to claim 1, wherein the removed part of the support plate exposes an entirety of both the pin as a power terminal and a pin adjacent to the pin as a power terminal.

* * * * *